(12) United States Patent
Suzuki et al.

(10) Patent No.: US 8,287,428 B2
(45) Date of Patent: Oct. 16, 2012

(54) POWER TRANSMISSION APPARATUS AND POWER TRANSMISSION CONTROL APPARATUS

(75) Inventors: Yoshihide Suzuki, Toyoake (JP); Hiroyuki Inagaki, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 224 days.

(21) Appl. No.: 12/893,210

(22) Filed: Sep. 29, 2010

(65) Prior Publication Data

US 2011/0086740 A1   Apr. 14, 2011

(30) Foreign Application Priority Data

Oct. 13, 2009 (JP) ................. 2009-236687

(51) Int. Cl.
  *B60W 10/02* (2006.01)
  *B60W 10/06* (2006.01)
(52) U.S. Cl. .......................... 477/5; 477/180
(58) Field of Classification Search .............. 477/5, 6, 477/180
  See application file for complete search history.

(56) References Cited

U.S. PATENT DOCUMENTS

| | | | |
|---|---|---|---|
| 2007/0278022 A1* | 12/2007 | Tanishima | 180/65.2 |
| 2008/0064560 A1* | 3/2008 | Popp et al. | 477/5 |
| 2008/0096717 A1* | 4/2008 | Houle et al. | 477/5 |
| 2009/0098977 A1* | 4/2009 | Kaltenbach | 477/5 |

FOREIGN PATENT DOCUMENTS

JP    11-164403 A    6/1999

* cited by examiner

*Primary Examiner* — Edwin A Young
(74) *Attorney, Agent, or Firm* — Buchanan Ingersoll & Rooney PC (57) ABSTRACT

A power transmission apparatus disposed includes: a motor for driving wheels, and transforms kinetic energy at the driving path to electrical energy; a normal close type clutch that includes an input and an output and is selectively set in an engaging state and a released state, wherein the clutch is normally set in the engaging state by a biasing member and is set in the released state when hydraulic pressure is applied; a hydraulic-pressure feeding device for supplying the adjusted hydraulic pressure to the clutch; and a control device for controlling the feeding device. When changing the clutch from the engaged state to the released state, if the difference between rotation numbers of the input and the output becomes equal to or larger than the predetermined value, the control device controls the feeding device to bring the clutch to a state just before the engaged state.

12 Claims, 7 Drawing Sheets

POWER TRANSMISSION APPARATUS AND POWER TRANSMISSION CONTROL APPARATUS

CROSS-REFERENCE OF APPLICATION

This application is based upon and claims the benefit of priority of Japanese Patent Application No. 2009-236687 filed on Oct. 13, 2009, the contents of which are incorporated herein by reference in its entirety.

BACKGROUND

An aspect of the disclosure relates to a power transmission apparatus and power transmission control apparatus.

JP-A 1999-164403 discloses one aspect of a power transmission apparatus. In this power transmission apparatus of JP-A 1999-164403, a crank shaft of an engine as a prime mover is coupled to a rotating shaft of a motor, as another prime mover cum a generator, and the rotating shaft of the motor is coupled to drive wheels of a vehicle. The vehicle is driven by the drive force of at least either one of the engine and the motor, and energy is regenerated by making the motor function as the generator when the vehicle slows down. A control device releases a clutch, which selectively disconnects the output shaft of the engine from the drive wheels, when the vehicle slows down. It also controls the motor in such a way as to generate a load corresponding to engine brake. The clutch is a hydraulic clutch.

SUMMARY

However, in case that the clutch of the power transmission apparatus disclosed in the JP-A 1999-164403 is a normal close type clutch in which the power can be transmitted between the engine and the motor in an engaged state between them due to biasing force of a biasing member while the power transmission between them is interrupted with a released state between them resulting from applying of hydraulic pressure to the clutch, there may occurs comparatively late applying of the hydraulic pressure to the clutch, and, thus, it takes a comparatively long time for the engine and the motor to be fully separated from each other for performing regenerative control when a vehicle slows down. For this reason, kinetic energy resulting from inertia of the moving vehicle may be considerably consumed due to engine friction (engine brake) for a time interval from beginning of disengagement of the clutch to completion of the disengagement, thereby producing insufficient energy regeneration efficiency.

Furthermore, in case that the regenerative control is carried out as the vehicle is cruising at a high speed, in addition to such insufficient energy regeneration efficiency as in the above-mentioned slowing down of the vehicle, there occurs, when the driver puts his or her foot down during the regenerative control in order to re-accelerate the vehicle, a problem that the driver may not feel well that the vehicle starts being accelerated, because it take a substantial time for the clutch to transition from the fully disengaged state between the engine and motor to the engaged state between them.

One of the aspects of the disclosure has been conceived with considerations of the above-mentioned situations and, thus, has an object to provide a power transmission apparatus including the normal close type clutch in which the energy regeneration efficiency may improve when changing the clutch from the engaged state to the released state, and, further, the driver may feel well that the vehicle starts being accelerated when the driver puts his or her foot down during the regenerative control in order to re-accelerate the vehicle, in other words, the driver may have continuous good driving feeling.

According to an aspect of the disclosure, a power transmission apparatus disposed at a driving path between an engine for generating driving force resulting from combustion of fuel and driving wheels driven by the driving force of the engine, the power transmission apparatus includes:

a motor that is provided at the driving path, and drives the driving wheels through the driving path by generating driving force resulting from electrical energy, and transforms kinetic energy at the driving path to electrical energy;

a normal close type clutch that is provided at the driving path and disposed between the engine and the motor, includes an input communicated with the engine and an output communicated with the driving wheels, and is selectively set in an engaging state in which the input is engaged with the output and a released state in which the input is released from the output, wherein the clutch is normally set in the engaging state by biasing force of a biasing member and is set in the released state when hydraulic pressure is applied;

a hydraulic-pressure feeding device configured to adjust the hydraulic pressure and supply the adjusted hydraulic pressure to the clutch; and a control device configured to control the hydraulic-pressure feeding device so that the hydraulic pressure applied to the clutch has a desired level, wherein in a case of changing the clutch from the engaged state to the released state, if a difference between rotation number of the input and that of the output is smaller than a predetermined value, the control device controls the hydraulic-pressure feeding device so that the hydraulic pressure applied to the clutch has a first level to bring the clutch to a fully released state; and, wherein if the difference becomes equal to or larger than the predetermined value, the control device controls the hydraulic-pressure feeding device so that the hydraulic pressure applied to the clutch has a second level lower than the first level to bring and keep the clutch to a state just before the engaged state.

DETAILED DESCRIPTIONS OF EXEMPLARY EMBODIMENTS

Figure 1:
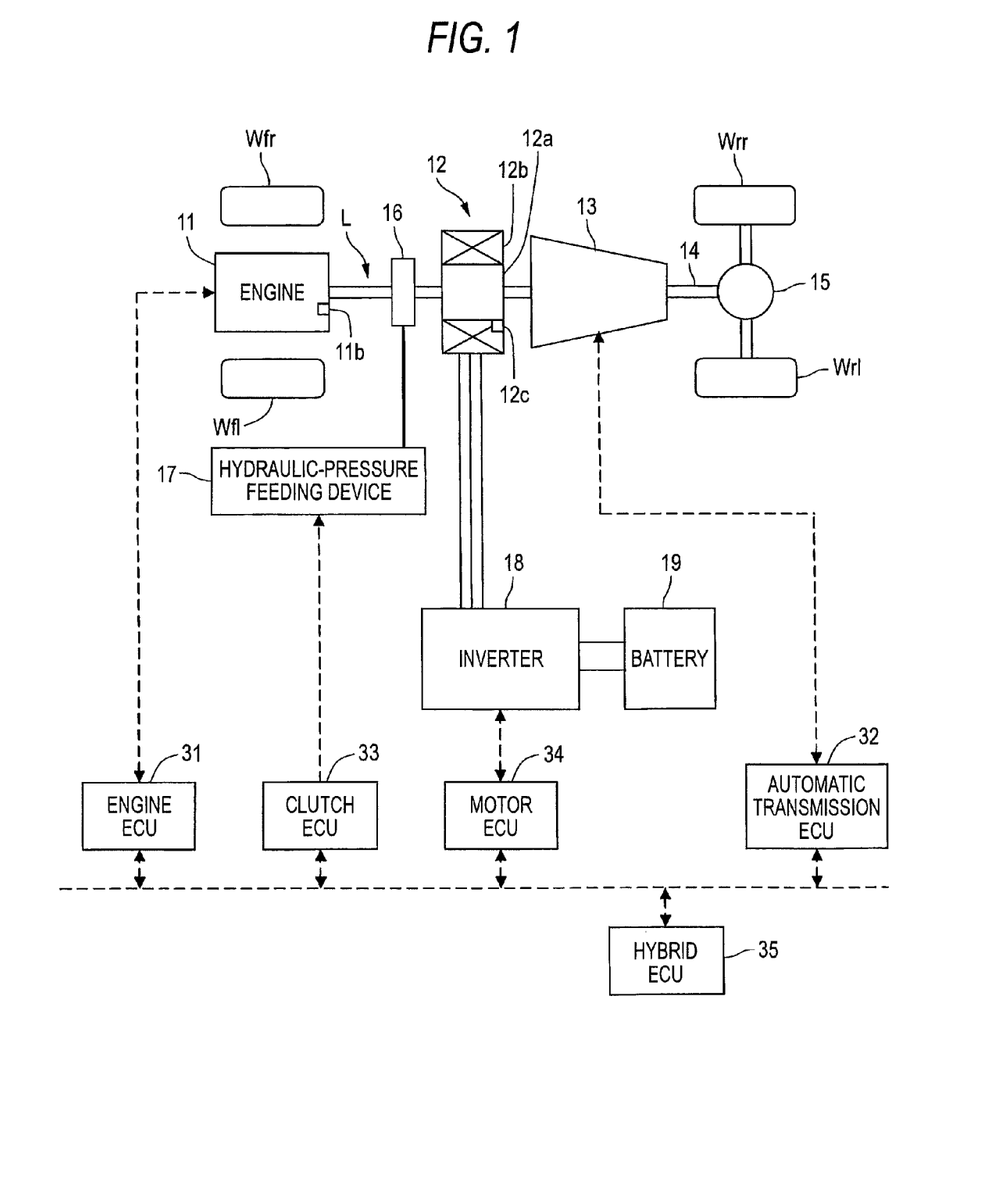
FIG. 1 is a schematic view of one embodiment of a hybrid vehicle to which a power transmission apparatus (a control device thereof) according to the aspect of the disclosure is applied.
Figure 2:
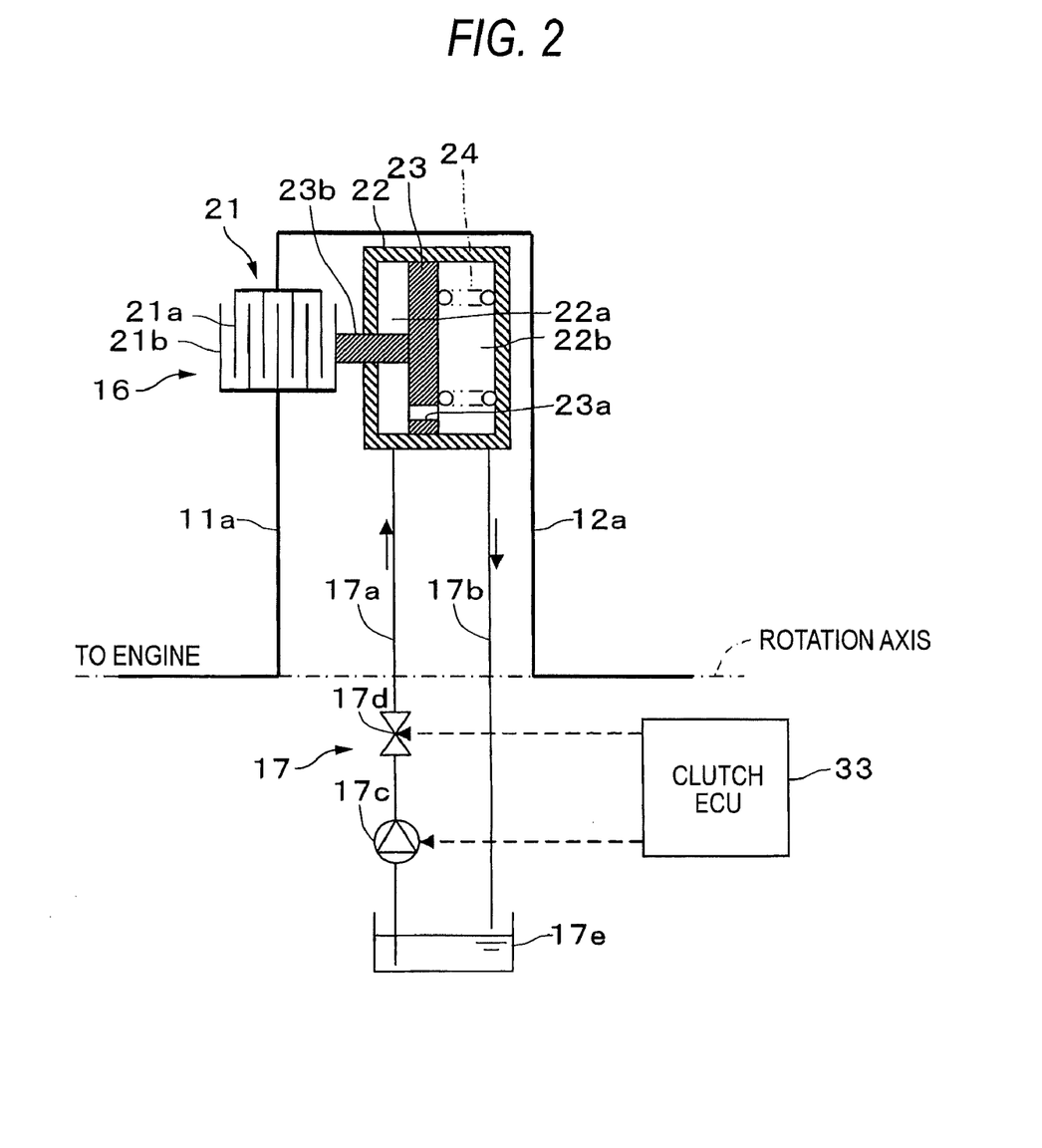
FIG. 2 is a schematic view of a configuration of a clutch and a hydraulic-pressure feeding device in FIG. 1.

A hybrid vehicle to which a power transmission apparatus (a control device thereof) according to an embodiment of the disclosure is applied will be described with reference to drawings. FIG. 1 is a schematic view of a hybrid vehicle to which a power transmission apparatus (a control device thereof) according to the embodiment of the disclosure is applied; and FIG. 2 is a schematic view of a configuration of a clutch and a hydraulic-pressure feeding device in FIG. 1.

In the hybrid vehicle, as shown in FIG. 1, driving wheels, for example, left and right rear wheels Wrl, Wrr are driven by a hybrid system. The hybrid system is a power train using, as its power source, combinations of an engine 11 and a motor 12. In this embodiment, the hybrid system is a parallel hybrid system in which both of the engine 11 and the motor 12 directly drive the vehicle wheels.

The engine 11 generates driving force resulting from combustion of fuel. The motor 12 is provided at a driving path L between the engine 11 and the driving wheels Wrl, Wrr driven by the driving force of the engine 11. The motor 12 generates driving force resulting from electrical energy to drive the driving wheels Wrl, Wrr, and functions as a generator so as to transform kinetic energy (resulting from inertia) to the electrical energy, thereby recovering the energy.

The driving path L is a path from the engine 11 to the driving wheels Wrl, Wrr and through which the power transfers between the engine 11 and the driving wheels. The driving force of the engine 11 transfers to the driving wheels (as in accelerating the vehicle), or the power of the driving wheels transfers to the engine 11 (as when the engine brake occurs). The engine 11 may be provided at the driving path L.

A crank axis (output axis) of the engine 11 is coupled to a rotation axis (input axis) of the motor 12 through a clutch 16. A rotation axis (output axis) of the motor 12 is coupled to a vehicle axis of tires (the driving wheels; the left and right rear wheels) Wrl, Wrr through a transmission 13, a propeller shaft 14 and a differential gear 15. The transmission 13 is a conventional automatic transmission. Meanwhile, the hybrid vehicle includes driven wheels (left and right front wheels) Wfl, Wfr.

The motor 12 includes a stator 12b fixed to a housing (for example, a housing of the transmission 13) fixed to a body of the vehicle, and a rotor 12a installed within the stator 12b so as to be rotated in a coaxial way with a radius direction of the stator 12b. A plurality of coils are wound around the stator 12b in order to generate magnetic field for rotating the rotor 12a.

The clutch 16 is provided at the driving path L and between the engine 11 and the motor 12 in such a way as to transfer the power between the engine 11 and the motor 12 in an engaging state, and to interrupt the power transmission between them in a released state. To be specific, the clutch 16 is disposed between the crank axis of the engine 11 and the rotation axis of the motor 12 and, thus, selectively enables/disables coupling between them. That is, the clutch 16 is a normal close type clutch in which it comes, in a non-controlling or non-operative state, into the engaging state due to the biasing force of a return spring 24 as a biasing member to enable the power transmission between the engine 11 and the motor 12, while it comes into the release or interruption mode due to applied hydraulic-pressure to disable the power transmission between the engine 11 and the motor 12. The non-operative state means as an ordinary time that any force from an external is not applied to the clutch 16.

Specifically, the clutch 16, as shown in FIG. 2, includes a friction member 21, a cylinder 22, a piston 23 fitted and inserted into the cylinder so as to be able to slide in an axial direction of the cylinder 23, and the return spring 24 returning the piston 23 from a releasing position for releasing the friction member 21 to an original full engagement position (indicated as a solid line in FIG. 2).

The friction member 21 includes a plurality of outer clutch plates 21a (output) and a plurality of inner clutch plates 21b (input), and the inner and outer clutch plates 21a, 21b are installed in parallel and alternate manners with each other in an axial direction. The outer clutch plates 21a are engaged in a spline way with an inner peripheral face of a rotary body 12a of the motor 12. In this embodiment, the rotary body 12a of the motor 12 is the rotor of the motor 12. The inner clutch plates 21b are engaged in a spline way with an outer peripheral face of a rotary body 11a of the engine 11. The rotary body 11a of the engine 11 is (directly) coupled to the crank axis of the engine 11.

The cylinder 22 rotates together with the rotary body 12a of the motor 12. Within the cylinder 22, first and second chambers 22a, 22b are formed which are, in an axial direction, partitioned with the piston 23.

The first chamber 22a communicates with a supplying path 17a through which oil fluid is supplied into the first chamber 22a. A communication hole 23a is formed in the piston 23 so that the first and second chambers 22a, 22b communicate with each other. A protrusion 23b is formed in a protrusion way from a side of the piston 23 facing the first chamber 22a. A tip end of the protrusion 23b is in contact with the friction member 21 in such a way as to press against the member 21. The second chamber 22b communicates with a discharging path 17b through which the oil fluid is discharged to the external. Within the second chamber 22b, the return spring 24 is installed which biases the piston 23 toward the first chamber 22a.

As shown in FIG. 1 and FIG. 2, the hybrid vehicle includes a hydraulic-pressure feeding device 17 for adjusting the hydraulic pressure and applying it to the clutch 16. The hydraulic-pressure feeding device 17 includes the supplying path 17a, the discharging path 17b, a pump 17c, an electronic valve 17d, and an oil container 17e.

The supplying path 17a is an oil path communicating the oil container 17e and the first chamber 22a of the cylinder 22 with each other and supplies standing oil fluid in the oil container 17e to the first chamber 22a. The discharging path 17b is an oil path communicating the oil container 17e and the second chamber 22b of the cylinder 22 with each other and, discharges the oil fluid from the second chamber 22b to the oil container 17e.

The pump (electric driven pump) 17c as a hydraulic-pressure source is installed at the supplying path 17a to inject the standing oil fluid within the oil container 17e into the first chamber 22a. The electronic valve 17d is provided at the supplying path 17a to adjust flow rate of the oil fluid injected from the pump 17c, in other words, to adjust the hydraulic pressure applied from the pump 17c to the clutch 16. The pump 17c and electronic valve 17d is configured to be controlled by control commands of a clutch ECU 33. For example, the clutch ECU 33 operates the pump 17c with predetermined injection rate and, at the same time, adjusts the electronic valve 17d with certain flow rate, so that the hydraulic pressure is adjusted and then applied to the first chamber 22a.

When the oil fluid is not supplied from the hydraulic-pressure feeding device 17 to the clutch 16, the piston 23 is pressured toward the first chamber 22a (in an engaging direction) due to the biasing force of the return spring 24. Then, when the protrusion 23b of the piston 23 presses against the friction member 21 due to the biasing force of the return spring 24, the inner and outer clutch plates 21a, 21b are pressed and in contact with each other, and, in turn, the rotary body 11a of the engine and the rotary body 12a of the motor are rotatably coupled to each other (the full engaging state as shown in FIG. 2 is accomplished).

Meantime, when the oil fluid is supplied from the hydraulic-pressure feeding device 17 to the clutch 16, the oil fluid is, first, supplied to the first chamber 22a, and, then, is supplied through the communication hole 23a to the second chamber 22b, and, subsequently, is discharged through the discharging path 17b to the oil container 17e. At this time, the piston 23 is pressured by the applied hydraulic pressure within the first chamber 22a, and, then, moves, with pressing against the biasing force of the return spring 24, toward the second chamber 22b (in a releasing direction). Then, the piston 23 is separated from the friction member 21, and, in turn, the pressed contact state between the inner and outer clutch plates 21a, 21b is inactivated, and, thus, the rotatably coupling state between the rotary body 11a of the engine and the rotary body 12a of the motor is inactivated.

As shown in FIG. 1, in the hybrid vehicle, the engine 11 is connected to an engine ECU 31, the transmission 13 is connected to an automatic transmission ECU 32, and the hydraulic-pressure feeding device 17 is connected to the clutch ECU 33. Further, the motor 12 is connected via an inverter 18 to a battery 19, and the inverter is connected to a motor ECU 34. The engine ECU 31, automatic transmission ECU 32, clutch ECU 33 and motor ECU 34 are interconnected so as to communicate with each other, and are connected to a hybrid ECU 35 in a communication way.

The engine ECU 31 controls the engine 11 (ECU: electronic control unit), and the rotation number of the engine 11 is input to the engine ECU 31 from a sensor 11b installed in the engine 11 for sensing the rotation number of the engine. The sensor 11b detects the rotation number of the crank axis of the engine 11 (i.e., the rotation number of the engine).

The automatic transmission ECU 32 controls the transmission 13. The clutch ECU 33 controls the hydraulic-pressure feeding device 17 so that the device 17 applies or discharges the hydraulic pressure to the clutch 16, and the clutch 16 enters into the released state or engaging state.

The motor 12, when the vehicle is accelerated, enhances the driving force in such a way as to assist in output of the engine 11. The motor 12, when braking the vehicle, generates the electrical energy and adds the braking force also used in regenerating the energy to the driving wheels. Moreover, the motor 12 also generates the electrical energy using the output of the engine 11, and serves as a starter in starting the engine. The inverter 18 is electrically connected to the battery 19 as a direct current (DC) source. The inverter 18 converts AC voltage input from the motor 12 to DC voltage and, then, supplies the DC voltage to the battery 19; or, conversely, the inverter 18 converts the DC voltage from the battery 19 to the AC voltage and, then, outputs the AC voltage to the motor 12.

The motor ECU 34 controls the motor 12 through the inverter 18 so that each of the above-mentioned operations is carried out. The rotation number of the motor 12 is input to the motor ECU 34 from a sensor 12c installed in the motor 12 for sensing the rotation number of the motor. The sensor 12c detects the rotation number of the rotor 12a of the motor 12 (i.e., the rotation number of the motor). In the meanwhile, the "rotation number" means rotation speed, i.e., the speed at which the rotary body rotates per unit time.

The hybrid ECU 35 controls each of the ECUs 31-34 in an integrated manner. The hybrid ECU 35 controls the engine 11, the motor 12, the clutch 16, etc in a such way as to start the engine 11 using the motor 12 when starting the vehicle, and to assist in the driving force of the engine 11 by adding the driving force of the motor 12 when accelerating the vehicle, and to drive the vehicle only using the driving force of the engine 11 without assistance of the motor 12 in a high-speed cruising. In addition, the hybrid ECU 35 may control the engine 11, the motor 12, the clutch 16, etc so that the vehicle is driven only by the driving force of the motor 12. Besides, the hybrid ECU 35 may control the engine 11, the motor 12, the clutch 16, etc so that the motor 12, when braking the vehicle (in reducing the speed of the vehicle), generates the electrical energy and adds the braking force also used in regenerating the energy to the driving wheels (this is the regenerative control). In the meanwhile, the clutch ECU 33 corresponds to the control device in claim(s). The control device controls the hydraulic-pressure feeding device 17 so that the hydraulic pressure applied to the clutch 16 has a desired level.

Next, operations of the above mentioned hybrid vehicle will be described with reference to FIG. 3 and FIG. 4. The hybrid ECU 35 executes a flow chart of FIG. 3 and a flow chart of FIG. 4 in a parallel way with each other. First, the case that the hybrid vehicle is already being driven is explained. At this time, the clutch 16 has come into the engaging state. Thus, the rotation number of the engine is equal to the rotation number of the motor. The operation request of the clutch is set to a engagement request of the clutch. The regenerative control is not performed.

The hybrid ECU 35, if the speed of the moving hybrid vehicle is equal to or higher than a first speed (for example, 40 km/h) and the brake pedal is turned on, determines "YES" at steps 102, 104, and, then, sets the operation request of the clutch relative to the hydraulic-pressure feeding device 17 to a release request of the clutch and sends this intention to the clutch ECU 33 (step 106). The clutch ECU 33, based on the intention that the operation request of the clutch is the release request of the clutch, controls the hydraulic-pressure feeding device 17 so that the clutch 16 comes into the released state (step 106).

On the other hand, if the speed of the moving hybrid vehicle is lower than the first speed or if the speed of the moving hybrid vehicle is equal to or higher than the first speed and the brake pedal is not turned on, the hybrid ECU 35 repeats "NO" determination at the step 102 or repeats "NO" determination at the step 104.

At the step 102, the speed of the moving hybrid vehicle is derived based on a detected value by a vehicle speed sensor, a vehicle-wheel speed sensor, etc. At the step 104, whether the brake pedal is turned on or not is determined based on on/off signals detected by a brake switch attached to the brake pedal. The operation request of the clutch is an operation request (control instruction) directed to the hydraulic-pressure feeding device 17, and, accordingly, the hydraulic-pressure feeding device 17, if the operation request of the clutch is an engagement request of the clutch, engages the clutch 16, and release the clutch 16 if the operation request of the clutch is the release request of the clutch.

At a step 108, the hybrid ECU 35 sets the command state to the regenerative control to an on state, and sends this intention to the motor ECU 34. The motor ECU 34, based on the intention that the command state to the regenerative control is the on state, controls the inverter 18 so that the motor 12 functions as the generator. In this way, the motor 12 recovers the kinetic energy of the (hybrid) vehicle by transforming it to electrical energy, and, further, adds to the vehicle (or wheels) the braking force resulting from torque generated in such regeneration.

The command to the regenerative control is a control instruction directed to the motor 12, and, accordingly, the motor ECU 34, if the command state to the regenerative control is the on state, has the motor 12 function as the generator, and has the motor 12 not function as the generator if the command state to the regenerative control is an off state (the latter case includes a case that the motor functions as the electric driven motor).

The vehicle slows down when the braking force (the braking force generated in the regeneration and/or the braking force resulting from the hydraulic pressure) is applied thereto. Then, when the vehicle speed becomes equal to or lower than a second speed (for example, 20 km/h) lower than the first speed, the hybrid ECU 35 determines "YES" at a step 110, and sets the command state to the regenerative control to the off state and sends this intention to the motor ECU 34 (at a step 112). The motor ECU 34, based on the intention that the command state to the regenerative control is the off state, controls the inverter 18 so as to stop the motor 12 from functioning as the generator (the regenerative control has stopped at the step 112). Moreover, the braking force resulting from torque generated in such regeneration is not added to the vehicle.

When the regenerative control has stopped, the hybrid ECU 35 controls the engine ECU 31 so that the rotation number of the engine 11 increases from an idle rotation state with a predetermined rate (at a step 114).

In addition, when the regenerative control has stopped, the hybrid ECU 35 sets the operation request of the clutch directed to the hydraulic-pressure feeding device 17 to the engagement request of the clutch, and sends this intention to the clutch ECU 33 (step 116). Then, the clutch ECU 33, based on the intention that the operation request of the clutch is the engagement request of the clutch, controls the hydraulic-pressure feeding device 17 so that the clutch 16 comes into the engaging state.

Figure 4:
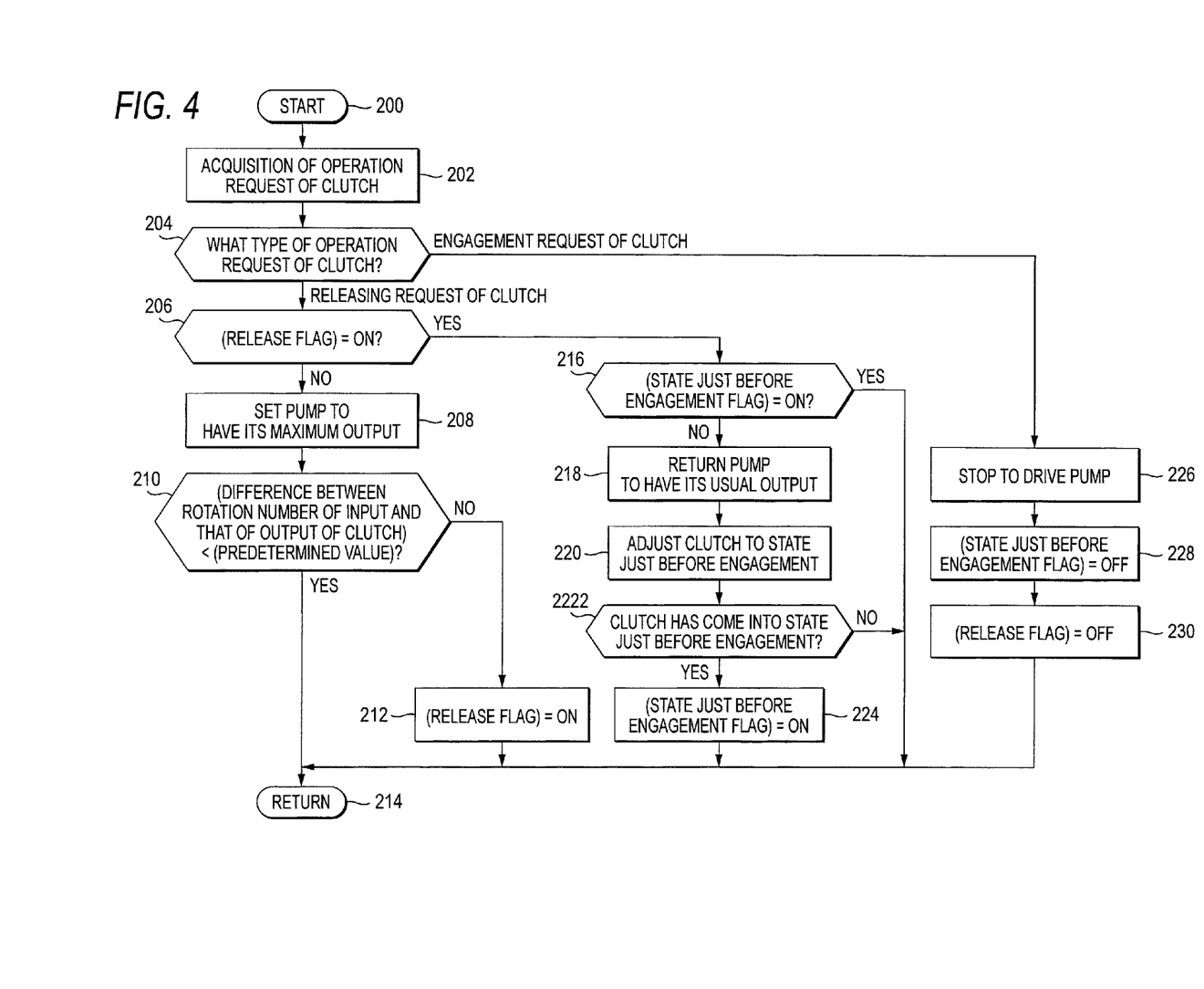
FIG. 4 is a flow chart of a control program (program controlling engagement and release of the clutch) executed by the control device in FIG. 1.

Besides, the clutch ECU 33 executes a program corresponding to the flow chart of FIG. 4 per a predetermined short time. The clutch ECU 33 acquires the operation request of the clutch from the hybrid ECU 35 at a step 202 whenever the program starts.

If the acquired operation request of the clutch is the release request of the clutch, the clutch ECU 33 has the program proceed to and, then, after a step 206, and carries out the releasing process of the clutch 16 (at steps 206 to 212, or steps 216 to 224). On the other hand, if the acquired operation request of the clutch is the engagement request of the clutch, the clutch ECU 33 has the program proceed to and after, then, a step 226, and carries out the engaging process of the clutch 16 (at steps 226 to 230).

In case that at the step 206, the releasing request of the clutch is acquired as the operation request of the clutch during the clutch 16 is being in the engaging state, the clutch ECU 33, since the release flag Fa is being set to OFF (at the step 230), determines "NO" at the step 206, and drives the pump 17c of the hydraulic-pressure feeding device 17 with its maximum output (at the step 208). Herein, the release flag Fa represents whether the clutch 16 is in the full released state or not, and, to be specific, Fa=ON represents that the clutch 16 is in the full released state while Fa=OFF represents that the clutch 16 is not in the full released state.

At the step 208, the pump 17c is driven with its maximum output and, at the same time, the electronic valve 17d is adjusted so as to be opened fully. In this way, the hydraulic-pressure feeding device 17 applies the maximum output level of the hydraulic pressure to the clutch 16. This maximum output level applied by the hydraulic-pressure feeding device 17 is a first pressure which causes the clutch 16 to be in the full released state. The first pressure is a pressure sufficient to have the clutch 16 be in the full released state and is higher than a second pressure (as will be described later) bringing and keeping the clutch 16 to the state just before the engagement state. In this embodiment, the first pressure is the maximum output pressure level applied by the hydraulic-pressure feeding device 17. In the meanwhile, the first pressure may be set to be in a range between 80% and 100% of the maximum output pressure level applied by the hydraulic-pressure feeding device 17. Herein, the "state just before the engagement state" means a state (a state just before a semi-clutch state) in which the engine and the motor are disengaged with each other to the extent that the power transmission between them is inactivated.

When the maximum output pressure level begins to be applied by the hydraulic-pressure feeding device 17, the clutch ECU 33 computes the difference between the rotation number of the input and that of the output of the clutch 16, and determines, based on the difference, whether the clutch 16 is in the full released state or not (at the step 210). Speaking specifically, the clutch ECU 33 receives the rotation number (Nm) of the motor 12 from the motor ECU 34 and the rotation number (Ne) of the engine 11 from the engine ECU 31 to compute (Nm-Ne) as the difference between the rotation numbers of the input and output of the clutch 16. The clutch ECU 33 compares the computed difference with a predetermined value, and has, if the difference is smaller than the predetermined value, that is, if the clutch 16 is not in the full released state or state (this case includes the engagement state, the semi-clutch state or the state just after the released state), the program progress to the step 214 and, thus, return to the step 202, and, then, has the hydraulic-pressure feeding device 17 continue to supply the maximum output pressure level to the clutch 16 until the difference becomes equal to or larger than the predetermined value. On the other hand, if the difference becomes equal to or larger than the predetermined value, that is, if the clutch 16 is in the full released state or state, the clutch ECU 33 sets the release flag Fa to ON at the step 212 and, then, has the program return to the step 202.

In case that the operation request of the clutch is the releasing request of the clutch and the release flag Fa is set to ON, the clutch ECU 33 determines "YES" at the step 206, and, then, controls the hydraulic-pressure feeding device 17 so that the hydraulic-pressure feeding device 17 supplies the second pressure as the hydraulic pressure to the clutch 16, resulting in bringing and keeping the clutch 16 to the state just before the engagement state (at the steps 218, 220). For the time interval from the time when the clutch 16 begins to come into the full released state after being released due to the releasing request of the clutch until and before the time when the clutch 16 comes into the state just before the engagement state, a state just before the engagement state flag Fb is set to OFF, and, thus, NO determination occurs at the step 216. Herein, the state just before the engagement state flag Fb represents whether the clutch 16 is in the state just before the engagement state or not, and, specifically, Fb=ON represents that the clutch 16 is in the state just before the engagement state while Fb=OFF represents that the clutch 16 is not in the state just before the engagement state.

At the steps 218, 220, the pump 17c returns to the usual output state and is driven with the usual output, and, at the same time, the electronic valve 17d is adjusted so that the output pressure of the pump 17c becomes the hydraulic pressure which causes the clutch 16 to be in the state just before the engagement state. In this way, the hydraulic-pressure feeding device 17 supplies to the clutch 16 the hydraulic pressure lower than the maximum output pressure level. This hydraulic pressure lower than the maximum output pressure level is the second pressure which causes the clutch 16 to be in the state just before the engagement state. The second pressure is lower than the first pressure which brings and keeps the clutch 16 to the full released state.

When the second pressure begins to be supplied from the hydraulic-pressure feeding device 17, the clutch ECU 33 determines whether the clutch 16 is in the state just before the engagement state or not (at the step 222). For example, the clutch ECU 33 determines, by determining whether a certain time interval lapses or not from the time when the second pressure begins to be supplied, whether the clutch 16 is in the state just before the engagement state or not. The certain time interval is an experimental value. Otherwise, such determination of whether the clutch 16 is in the state just before the engagement state or not may be carried out by checking the pressure with a pressure sensor or by examining movement amount of the clutch 16 with a stroke sensor.

If the clutch ECU 33 determines that clutch 16 is not in the state just before the engagement state (that is, for the time interval from the time when the clutch begins to come into the full released state until and before the time when the clutch comes into the state just before the engagement state), the clutch ECU 33 recognizes that the regulation of the clutch to the state just before the engagement state has not been completed, and, thus, has the program proceed to the step 214 and then return to the step 202 from which the hydraulic-pressure feeding device 17 continues to apply the second pressure so that the clutch 16 comes into the state just before the engagement state. On the other hand, if the clutch 16 comes into the state just before the engagement state, the state just before the engagement state flag Fb is set to ON at the step 224 and, then, the program returns to the step 202.

If the operation request of the clutch is the engagement request of the clutch, the clutch ECU 33 has the program proceed to the step 226 at which applying of the hydraulic pressure to the clutch 16 stops. To be specific, the clutch ECU 33 has the pump 17c stop to be driven, and, at the same time, has the electronic valve 17d closed. In the way, applying of the hydraulic pressure to the clutch 16 stops, and the clutch 16 comes into the engaging state due to the biasing force (drag) of the return spring 24.

Thereafter, the clutch ECU 33 sets the state just before the engagement state flag Fb to OFF (at the step 228) and sets the release flag Fa to OFF (at the step 230).

Operations of the above-described hybrid vehicle will be explained with reference to the time chart of FIG. 5. The vehicle speed is equal to or higher than the first speed. At this time, the clutch 16 is in the engaging state. Therefore, the rotation number of the motor is equal to the rotation number of the engine. The regenerative control is not performed.

At the time t1, when the brake pedal is turned on ("YES" determination occurs at the step 104), the operation request of the clutch becomes the releasing request of the clutch (instruction to begin the clutch releasing is issued), and, thus, the hydraulic-pressure feeding device 17 starts to apply the hydraulic pressure to the clutch 16 (at the step 208). That is, the maximum output pressure level of the hydraulic-pressure feeding device 17 is applied to the clutch 16, and, finally, the clutch 16 comes into the released state due to the maximum output pressure level. In this way, the hydraulic-pressure feeding device 17 can release the clutch 16 at highest rate thereof.

At this time, the hydraulic pressure within the chamber 22a of the clutch 16 increases from 0 and then reaches the first pressure at the time t2, so that the clutch 16 comes into the full released state.

At the time t1, the command to the regenerative control is issued at the same time when the hydraulic pressure beings to be applied to the clutch 16, so that the inverter 18 has the motor 12 start to perform the regenerative control (at the step 108). At this time, if the clutch 16 is in the full released state, the engine 11 and the motor 12 are fully disengaged with each other, and the kinetic energy may not be consumed due to the engine friction, thereby recovering the kinetic energy to the electrical energy. However, for the time interval from the full engagement state of the clutch 16 until and before the released state of the clutch 16, the motor 12 and the engine 11 are not fully disengaged with each other, and the kinetic energy may be consumed due to the engine friction, resulting in that the kinetic energy may not recovered to the electrical energy. That is, for the time interval between t1 to t2, the regenerated energy amount (regenerating torque) increases from 0 to the maximum regenerated amount.

Herein, explained may be the case that at the time t1, the hydraulic-pressure feeding device 17 begins to apply to the clutch 16 the hydraulic pressure whose level becomes the ordinary or usual level (for example, 50% to 60% of the maximum output pressure of the hydraulic-pressure feeding device 17) lower than the maximum output pressure of the hydraulic-pressure feeding device 17. At this case, the ordinary or usual pressure level is applied to the clutch 16 from the hydraulic-pressure feeding device 17, and, thus, the hydraulic pressure within the first chamber 22a of the clutch 16 increases, and, finally, at the time t6, the clutch 16 comes into the full released state (this is indicated as a broken line in the "hydraulic pressure" section of FIG. 5). However, the time taken for the clutch 16 to come into the full released state (or the engagement state (including the semi-clutch state)) is longer than that in case that the maximum output pressure of the hydraulic-pressure feeding device 17 is applied to the clutch 16.

Figure 5:
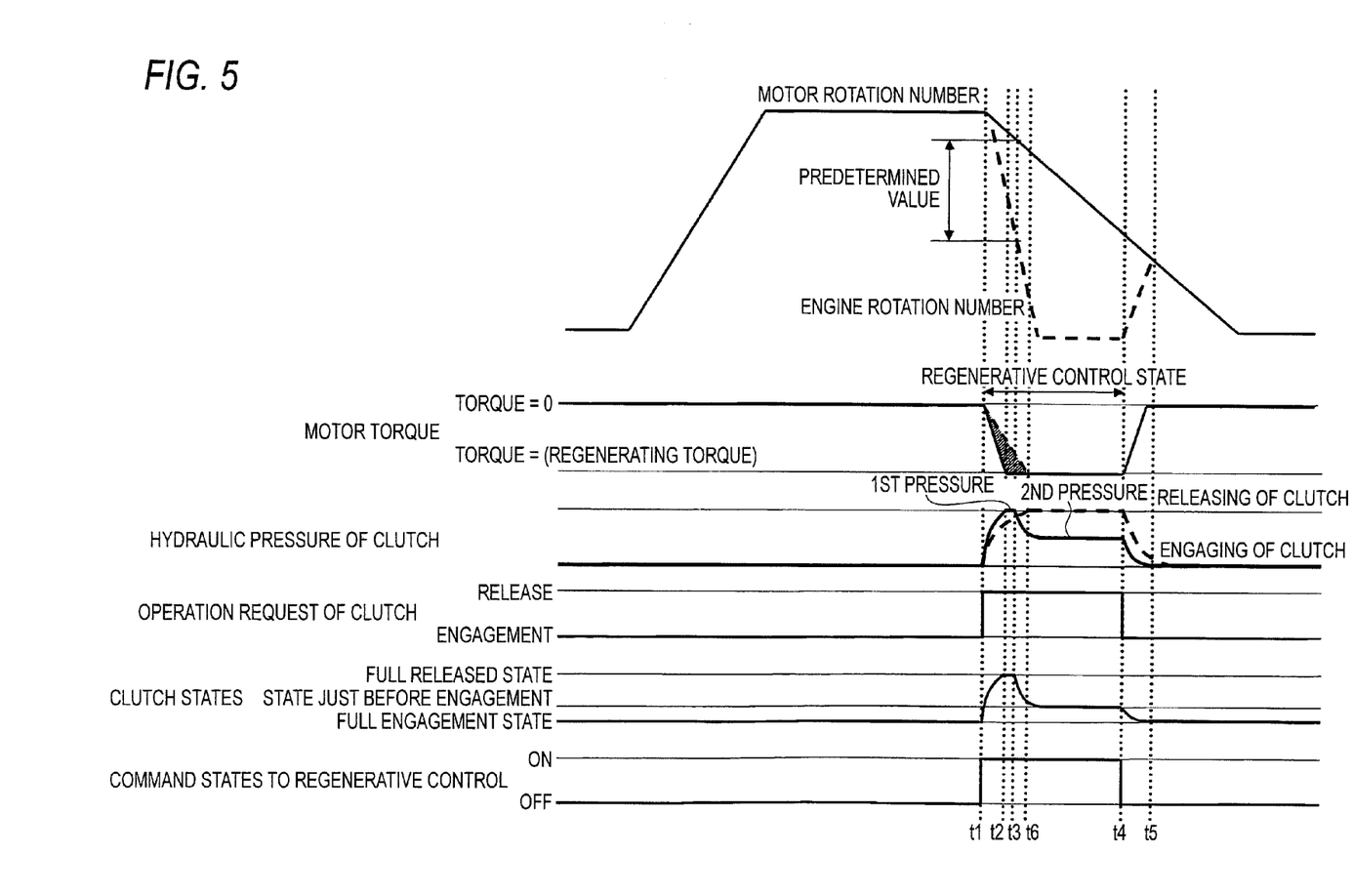
FIG. 5 is a time chart showing operations according to the flow charts of FIG. 3 and FIG. 4, in which a motor rotation number, engine rotation number, motor torque, hydraulic pressure of the clutch, operation request of the clutch, clutch states, and command states to regenerative control are listed in the named order from a top end.

Therefore, in that the time interval during which the motor 12 and engine 11 are not fully separated from each other becomes longer, the kinetic energy may be consumed due to the engine friction and, further, the time interval during which all of the kinetic energy cannot be recovered to the electrical energy becomes longer (this is indicated as a broken line in the "motor torque" section of FIG. 5).

Regarding such energy recovery, according to this embodiment, the engine 11 and the motor 12 can be fully separated from each other as early as possible, and all of the kinetic energy can be recovered to the electrical energy at the earlier time. That is, this is indicated as a solid line in the "motor torque" section of FIG. 5 and the regeneration efficiency may improve by amount corresponding to the slant line portion.

Moreover, because the brake pedal is turned on at the time t1, the braking force is applied to the vehicle and, thus, the rotation number of the motor reduces. Because the accelerating pedal is turned off, the rotation number of the engine reduces more rapidly than the rotation number of the motor reduces, and, then, the engine comes into the idle rotation state at which the engine ECU 31 keeps the idle rotation state by supplying the fuel to the engine 11. In the meanwhile, for the time interval between t1 and t5, the motor rotation number is indicated as a solid line while the engine rotation number is indicated as a broken line. For the time interval before t1 and the time interval after t5, all rotation numbers are indicated as a solid line (the motor rotation number is the same as the engine rotation number).

If the clutch 16 is in the engagement (full engagement) mode, the difference between the rotation numbers of the input and output of the clutch 16 is zero. When as mentioned above, the clutch 16 begins to be released by applying the maximum pressure from the hydraulic-pressure feeding device 17 to the clutch 16 at the time t1, the difference between the rotation numbers of the input and output of the clutch 16 begins to increase. If the difference between the rotation numbers of the input and output of the clutch 16 is smaller than the predetermined value, the hydraulic-pressure feeding device 17 continues to apply its maximum output pressure level to the clutch 16.

If at the time t3, the difference between the rotation numbers of the input and output of the clutch 16 is equal to or larger than the predetermined value, it is determined that the clutch 16 has come into the full released state, and, thus, the pump 17c returns to the usual or ordinary output state and is driven with the usual level, and, at the same time, the electronic valve 17d is adjusted so that the output pressure of the pump 17c becomes the hydraulic pressure (the second pressure) which causes the clutch 16 to be in the state just before the engagement state. That is, the hydraulic-pressure feeding device 17 begins to apply the second pressure to the clutch 16, and, then, continues to apply the second pressure before and until the clutch 16 starts to come into the engagement state, and, in turn, the clutch 16 is brought and kept to the state just before the engagement state.

Subsequently, when at the time t4, the vehicle speed becomes lower than the second speed, the command to the regenerative control is turned off, and, thus, the inverter 18 controls the motor 12 so that the motor 12 stops to perform the regenerative control (at the step 112), and, the rotation number of the engine 11 increases from the idle rotation state with the predetermined rate (at the step 114). At the time t4, the regenerative control for the motor 12 has been terminated. At the time t4, in addition to those operations, the engagement request of the clutch (instruction to start engaging the clutch) is issued, and, as a result, the hydraulic-pressure feeding device 17 stops to apply the hydraulic pressure to the clutch 16 (at the step 226). Thus, the clutch 16 begins to come into the engaging state due to the biasing force of the return spring 24, and, finally, has come to the full engagement state. Such full engagement is accomplished at the time t5.

As is apparent from the above mentioned explanations, in the power transmission apparatus (or the control device thereof) according to the embodiment, in the case of changing the normal close type clutch 16 from the engaged state to the released state, if a difference between rotation numbers of the input and that of the output of the clutch 16 is smaller than the predetermined value (i.e., at the just beginning time of the regenerative control), the control device (the hybrid ECU 35 and/or the clutch ECU 33) controls the hydraulic-pressure feeding device 17 so that the hydraulic pressure supplied to the clutch 16 has the first level (or pressure), and brings the clutch 16 to the fully released state (for the time interval between t1 and t3 in FIG. 5). In this way, since the hydraulic pressure the first pressure may be applied to the clutch from the very beginning time (t1) of disengagement of the clutch 16, if the first level is set to be comparatively high pressure (for example, the maximum output pressure level of the hydraulic-pressure feeding device 17), the disengagement process of the clutch 16 has been finished as early as possible. In the meanwhile, regarding the regenerative controlling in parallel with the disengagement of the clutch 16, the kinetic energy resulting from inertia of the moving vehicle may be consumed due to the engine friction (engine brake) for the time interval from beginning time t1 of the disengagement to completion time t2 of the disengagement. However, in that the disengagement process of the clutch 16 has been finished as early as possible as mentioned above (in other words, the time taken for the disengagement process becomes short), the consumption of the kinetic energy due to the engine friction may reduce, and, further, the energy regeneration efficiency may be improved by enlarging a region in which the energy is able to be regenerated (the region may increase by a region corresponding to the slant line portion in the "motor torque" section of FIG. 5 as compared to the case that the usual pressure is applied). Besides, now that the output of the pump 17c may reduce during the regenerative control, the hydraulic-pressure feeding device 17 may operate in an energy saving way.

Moreover, as mentioned above, the control device brings the clutch 16 to the fully released state, and, thereafter, if the difference between rotation number of the input and that of the output of the clutch becomes equal to or larger than the predetermined value (at the time t3), controls the hydraulic-pressure feeding device 17 so that the hydraulic pressure applied to the clutch has the second level or pressure lower than the first level, and brings and keeps the clutch 16 to the state just before the engaged state. In this manner, in bringing the clutch 16 to the engaged state, it is possible to quickly change the clutch 16 to the engaged state from the state just before the engaged state. For example, it is possible to shorten the engagement process time in the disclosure as compared to an engagement process which changes the clutch 16 to the engaged state from a state more approximate to the fully released state than to the state just before the engaged state. Therefore, the driver may carry out the rotational synchronization of the clutch 16 with good feedback.

Further, the first level or pressure becomes a maximum output pressure of the hydraulic-pressure feeding device 17. Thus, the maximum output pressure of the hydraulic-pressure feeding device 17 may be applied to the clutch 16 from the very beginning time t1 of the disengagement of the clutch 16, and, therefore, the disengagement process of the clutch 16 may have been finished at the highest processing rate. Additionally, the energy regeneration efficiency may be further improved by enlarging the region in which the energy is able to be regenerated.

Furthermore, the hydraulic-pressure feeding device 17 at least includes the pump 17c, and the electronic valve 17d adjusting the hydraulic pressure applied from the pump 17c, and adjusts the hydraulic pressure (or the flow rate of the oil fluid) by controlling opening and closing of the electronic valve (proportional control). In this way, it is possible with a simple configuration to appropriately adjust the hydraulic pressure applied to the clutch 16.

Meanwhile, although in the above-mentioned embodiment, the pump 17c is employed as the hydraulic pressure source, an accumulator accumulating the hydraulic pressure generated from the pump 17c may be provided together with the pump 17c. As an alternative, only the accumulator may be provided which accumulates the hydraulic pressure applied from a different hydraulic-pressure generating device (for example, a hydraulic-pressure pump of the automatic transmission) from the pump 17c.

It may be contemplated that the electronic valve 17d is not provided but the pump 17c is provided. At this case, the hydraulic pressure may be adjusted by adjusting the injection rate of the pump 17c. Therefore, the hydraulic-pressure feeding device 17 at least includes the pump 17c and adjusts the hydraulic pressure by adjusting the injection rate of the pump 17c. In this manner, it is possible with the simpler configuration to appropriately adjust the hydraulic pressure applied to the clutch 16.

It may be contemplated that in the flow chart of FIG. 4, after the determination of the difference between rotation number of the input and that of the output of the clutch, the pump 17c is set to have its maximum output level.

In the meanwhile, although in the above-mentioned embodiment, the control example in the case that the hybrid vehicle is already moving with the speed equal to or higher than the first speed and the brake pedal is turned on has been described, the aspect of the disclosure may be applied to the case that the hybrid vehicle is cruising with the high speed and there is a requirement that the battery needs to be electrically charged.

Figure 3:
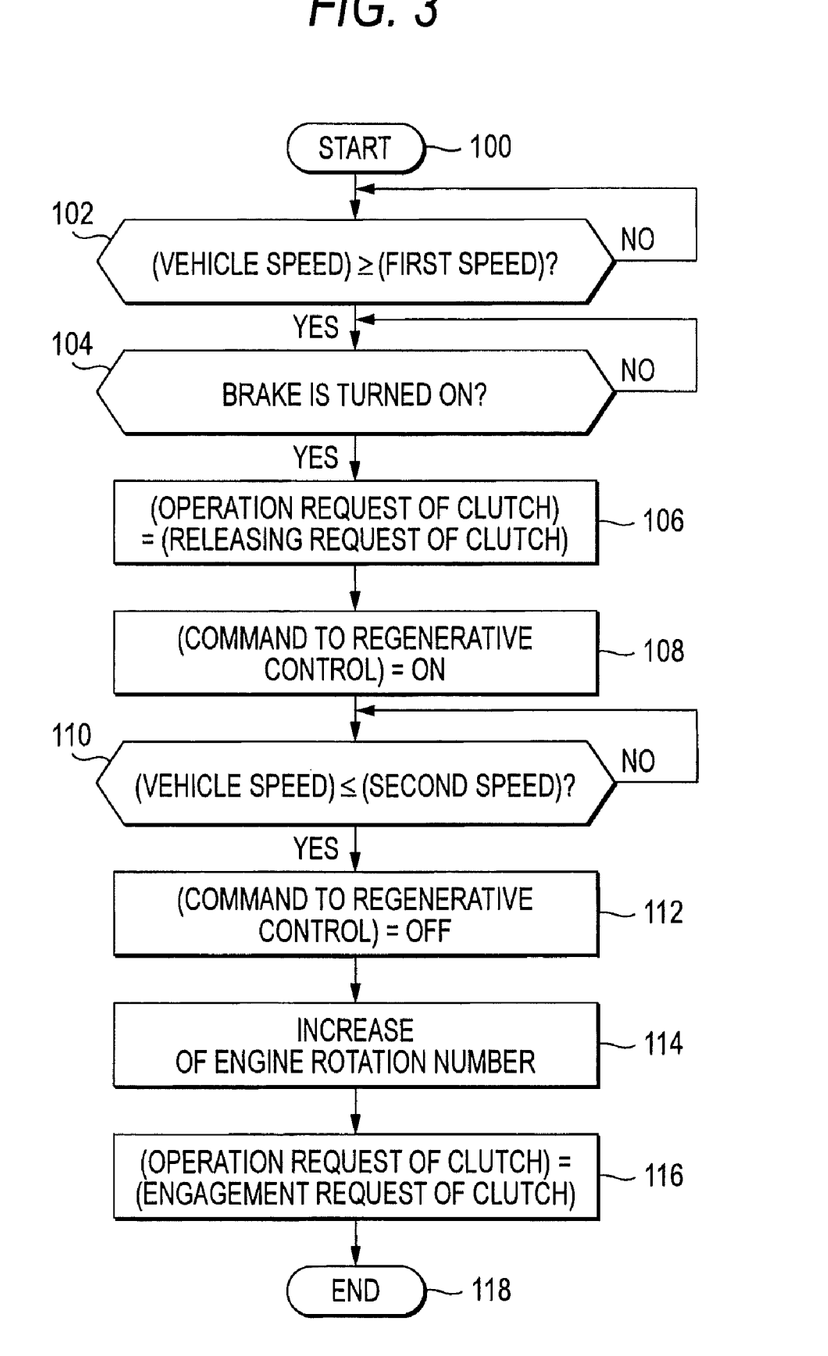
FIG. 3 is a flow chart of a control program executed by a control device in FIG. 1.
Figure 6:
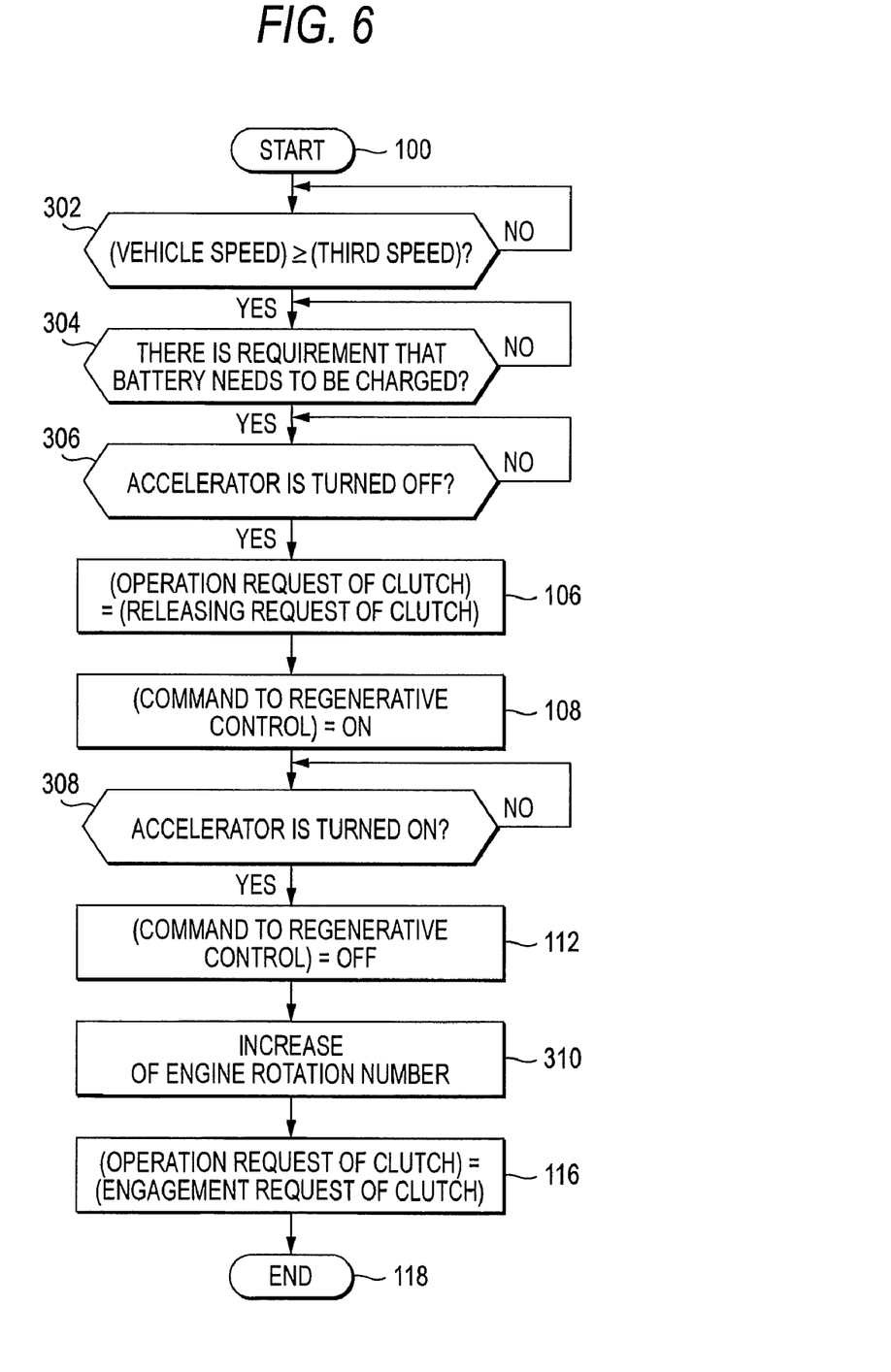
FIG. 6 is a flow chart of another control program executed by the control device in FIG. 1.

At this case, the hybrid ECU 35 executes the flow chart of FIG. 6 instead of the flow chart of FIG. 3. In FIG. 6, the same steps as those in the flow chart of FIG. 3 have the same reference numerals as in FIG. 3, and the descriptions of which will be omitted.

The hybrid ECU 35, if the hybrid vehicle is cruising with the high speed (the speed of the moving vehicle is equal to or higher than a third speed (e.g., 20 km/h), and, in this embodiment, is for example 80 km/h), and there is the requirement that the battery needs to be electrically charged, and the accelerating pedal is turned off, determines "YES" at steps 302, 304, 306, and, then, the clutch ECU 33 controls the hydraulic-pressure feeding device 17, based on the intention that the operation request of the clutch is a releasing request of the clutch, so that the clutch 16 comes into the released state (at the step 106: the releasing step in the flow chat of FIG. 4).

At the step 302, the vehicle speed is derived from a detected value by the vehicle speed sensor, the vehicle-wheel speed sensor or the like. At the step 306 (step 308), the on/off states of the accelerating pedal is determined based on the accelerator opening rate detected by an accelerator opening rate sensor attached to the accelerating pedal. At the step 304, whether there is or not the requirement that the battery needs to be electrically charged is determined based on the monitored voltage when the motor ECU 34 monitors the voltage of the battery 19.

Then, the hybrid ECU 35 executes the step 308 of FIG. 6 instead of the step 110 of FIG. 3. At this step 308, whether the accelerating pedal is turned on or not is determined. If the accelerating pedal is turned on, the hybrid ECU 35 determines "YES" at the step 308, and, then, terminates the regenerative control (at the step 112), and, next, has the engine ECU 31 increase, depending on the accelerator opening rate, the rotation number of the engine 11 from the idle rotation state (at the step 310), and, subsequently, controls the hydraulic-pressure feeding device 17, based on the intention that the operation request of the clutch is a engagement request of the clutch, so that the clutch 16 comes into the engaging state (at the step 116: the engaging step in the flow chat of FIG. 4).

Next, operations of the above-mentioned hybrid vehicle will be described with reference to the time chart of FIG. 7. The case will be explained in which the hybrid vehicle is cruising with the high speed and there is the requirement that the battery needs to be electrically charged. At this time, the clutch 16 is in the engaging state. Therefore, the rotation number of the motor is equal to the rotation number of the engine. The regenerative control is not performed.

At the time t11, when the accelerating pedal is turned off ("YES" determination occurs at the step 306), the operation request of the clutch becomes the releasing request of the clutch (instruction to begin the clutch releasing is issued), and, thus, the hydraulic-pressure feeding device 17 starts to apply the hydraulic pressure to the clutch 16 (at the step 208). That is, the maximum output pressure level of the hydraulic-pressure feeding device 17 is applied to the clutch 16, and, finally, the clutch 16 comes into the released state due to the maximum output pressure level. In this way, the hydraulic-pressure feeding device 17 can release the clutch 16 at the highest rate thereof.

At this time, the hydraulic pressure within the chamber 22a of the clutch 16 increases from 0 and then reaches the first pressure at the time t12, so that the clutch 16 comes into the full released state.

At the time t11, the command to the regenerative control is issued at the same time when the hydraulic pressure beings to be applied to the clutch 16, so that the inverter 18 has the motor 12 start to perform the regenerative control (at the step 108). In this way, for the time interval between t11 to t12, the regenerated energy amount (regenerating torque) increases from 0 to the maximum regenerated amount.

Herein, explained may be the case that at the time t11, the hydraulic-pressure feeding device 17 begins to apply to the clutch 16 the hydraulic pressure whose level becomes the ordinary or usual level (for example, 50% to 60% of the maximum output pressure of the hydraulic-pressure feeding device 17) lower than the maximum output pressure of the hydraulic-pressure feeding device 17. At this case, the ordinary or usual pressure level is applied to the clutch 16 from the hydraulic-pressure feeding device 17, and, thus, the hydraulic pressure within the first chamber 22a of the clutch 16 increases, and, finally, at the time t16, the clutch 16 comes into the full released state (this is indicated as a broken line in the "hydraulic pressure" section of FIG. 7). However, the time taken for the clutch 16 to come into the full released state (or the engagement state (including the semi-clutch state)) is longer than that in case that the maximum output pressure of the hydraulic-pressure feeding device 17 is applied to the clutch 16. Therefore, in that the time interval during which the motor 12 and engine 11 are not fully separated from each other becomes longer, the kinetic energy may be consumed due to the engine friction and, further, the time interval during which all of the kinetic energy cannot be recovered to the electrical energy becomes longer (this is indicated as a broken line in the "motor torque" section of FIG. 7).

Regarding such energy recovery, according to this embodiment, the engine 11 and the motor 12 can be fully separated from each other as early as possible, and all of the kinetic energy can be recovered to the electrical energy at the earlier time. That is, this is indicated as a solid line in the "motor torque" section of FIG. 7 and the regeneration efficiency may improve by amount corresponding to the slant line portion.

Moreover, because the accelerating pedal is turned off, the rotation number of the engine reduces rapidly, and, then, the engine comes into the idle rotation state at which the engine ECU 31 keeps the idle rotation state by supplying the fuel to the engine 11. If the driver keeps the vehicle speed at the constant level, the rotation number of the motor 12 is constant. In the meanwhile, for the time interval between t11 and t15, the motor rotation number is indicated as a solid line while the engine rotation number is indicated as a broken line. For the time interval before t11 and the time interval after t15, all rotation numbers are indicated as a solid line (the motor rotation number is the same as the engine rotation number).

If the clutch 16 is in the engagement (full engagement) mode, the difference between the rotation numbers of the input and output of the clutch 16 is zero. When as mentioned above, the clutch 16 begins to be released by applying the maximum pressure from the hydraulic-pressure feeding device 17 to the clutch 16 at the time t11, the difference between the rotation numbers of the input and output of the clutch 16 begins to increase. If the difference between the rotation numbers of the input and output of the clutch 16 is smaller than the predetermined value, the hydraulic-pressure feeding device 17 continues to apply its maximum output pressure level to the clutch 16.

If at the time t13, the difference between the rotation numbers of the input and output of the clutch 16 is equal to or larger than the predetermined value, it is determined that the clutch 16 has come into the full released state, and, then, the hydraulic-pressure feeding device 17 begins to apply the second pressure to the clutch 16, and, then, continues to apply the second pressure before and until the clutch 16 starts to come into the engagement state, and, in turn, the clutch 16 is brought and kept to the state just before the engagement state.

Subsequently, when at the time t14, the accelerating pedal is turned on again, the command to the regenerative control is turned off, and, thus, the inverter 18 controls the motor 12 so that the motor 12 stops to perform the regenerative control (at the step 112), and, the rotation number of the engine 11, depending on the accelerator opening rate, increases from the idle rotation state (at the step 310). At the time t14, the regenerative control for the motor 12 has been terminated. At the time t14, in addition to those operations, the engagement request of the clutch (instruction to start engaging the clutch) is issued, and, as a result, the hydraulic-pressure feeding device 17 stops to apply the hydraulic pressure to the clutch 16 (at the step 226). Thus, the clutch 16 begins to come into the engaging state due to the biasing force of the return spring 24, and, finally, has come to the full engagement state. Such full engagement is accomplished at the time t15.

Figure 7:
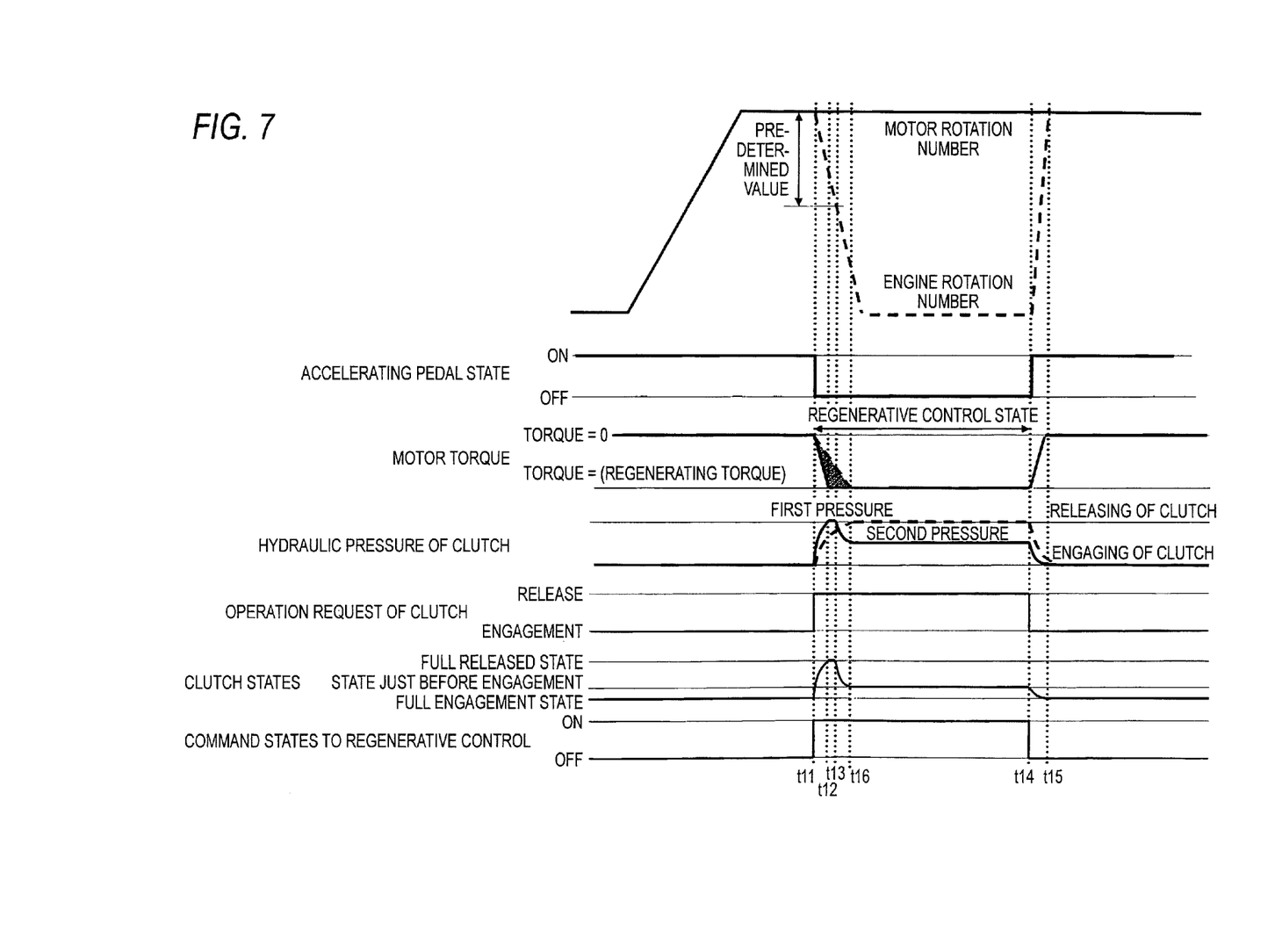
FIG. 7 is a time chart showing operations according to the flow charts of FIG. 4 and FIG. 6, in which a motor rotation number, engine rotation number, on/off states of an accelerating pedal, motor torque, hydraulic pressure of the clutch, operation request of the clutch, clutch states, and command states to regenerative control are listed in the named order from a top end.

As apparent from the above mentioned explanations, in the power transmission apparatus (or the control device thereof) according to the embodiment, in the case of changing the normal close type clutch 16 from the engaged state to the released state, if a difference between rotation numbers of the input and that of the output of the clutch 16 is smaller than the predetermined value (i.e., at the just beginning time of the regenerative controlling), the control device (the hybrid ECU 35, the clutch ECU 33), controls the hydraulic-pressure feeding device 17 so that the hydraulic pressure supplied to the clutch 16 has the first level (or pressure), and brings the clutch 16 to the fully released state (for the time interval between t11 and t13 in FIG. 7). In this way, since the hydraulic pressure the first pressure may be applied to the clutch from the very beginning time (t11) of disengagement of the clutch 16, if the first level is set to be comparatively high pressure (for example, the maximum output pressure level of the hydraulic-pressure feeding device 17), the disengagement process of the clutch 16 has been finished as early as possible. In the meanwhile, regarding the regenerative controlling in parallel with the disengagement of the clutch 16, the kinetic energy resulting from inertia of the moving vehicle may be consumed due to the engine friction (engine brake) for the time interval from beginning time t11 of the disengagement to the completion time t12 of the disengagement. However, in that the disengagement process of the clutch 16 has been finished as early as possible as mentioned above (in other words, the time taken for the disengagement process becomes short), the consumption of the kinetic energy due to the engine friction may reduce, and, further, the energy regeneration efficiency may be improved by enlarging a region in which the energy is able to be regenerated (the region may increase by a region corresponding to the slant line portion in the "motor torque" section of FIG. 7 as compared to the case that the usual pressure is applied). Besides, now that the output of the pump 17c may reduce during the regenerative control, the hydraulic-pressure feeding device 17 may operate in an energy saving way.

Moreover, the control device, as mentioned above, brings the clutch 16 to the fully released state, and, thereafter, if the difference between rotation number of the input and that of the output of the clutch becomes equal to or larger than the predetermined value (at the time t13), controls the hydraulic-pressure feeding device 17 so that the hydraulic pressure applied to the clutch has the second level or pressure lower than the first level, and brings and keeps the clutch 16 to the state just before the engaged state. In this manner, in bringing the clutch 16 to the engaged state, it is possible to quickly change the clutch 16 from the state just before the engaged state to the engaged state. For example, it is possible to shorten the engagement process time in the disclosure as compared to an engagement process which changes the clutch 16 to the engaged state from a state more approximate to the fully released state than to the state just before the engaged state. Therefore, the driver may feel well that the vehicle starts being accelerated when the driver puts his or her foot down during the regenerative control in order to re-accelerate the vehicle, in other words, the driver may have continuous good driving feeling.

According to a first aspect of the disclosure, a power transmission apparatus disposed at a driving path between an engine for generating driving force resulting from combustion of fuel and driving wheels driven by the driving force of the engine, the power transmission apparatus includes:

a motor that is provided at the driving path, and drives the driving wheels through the driving path by generating driving force resulting from electrical energy, and transforms kinetic energy at the driving path to electrical energy;

a normal close type clutch that is provided at the driving path and disposed between the engine and the motor, includes an input communicated with the engine and an output communicated with the driving wheels, and is selectively set in an engaging state in which the input is engaged with the output and a released state in which the input is released from the output, wherein the clutch is normally set in the engaging state by biasing force of a biasing member and is set in the released state when hydraulic pressure is applied;

a hydraulic-pressure feeding device configured to adjust the hydraulic pressure and supply the adjusted hydraulic pressure to the clutch; and a control device configured to control the hydraulic-pressure feeding device so that the hydraulic pressure applied to the clutch has a desired level, wherein in a case of changing the clutch from the engaged state to the released state, if a difference between rotation number of the input and that of the output is smaller than a predetermined value, the control device controls the hydraulic-pressure feeding device so that the hydraulic pressure applied to the clutch has a first level to bring the clutch to a fully released state; and, wherein if the difference becomes equal to or larger than the predetermined value, the control device controls the hydraulic-pressure feeding device so that the hydraulic pressure applied to the clutch has a second level lower than the first level to bring and keep the clutch to a state just before the engaged state.

According to a second aspect of the disclosure, the first level is a maximum output pressure of the hydraulic-pressure feeding device.

According to a second aspect of the disclosure, the hydraulic-pressure feeding device includes an hydraulic-pressure source and an electronic valve for adjusting the hydraulic-pressure applied from the hydraulic-pressure source, and the control device adjusts the hydraulic pressure by controlling opening and closing of the electronic valve.

According to a third aspect of the disclosure, the hydraulic-pressure feeding device includes a pump, and the control device adjusts the hydraulic pressure by controlling injection rate of the pump.

According to a fourth aspect of the disclosure, a power transmission control apparatus for a power transmission apparatus disposed at a driving path between an engine for generating driving force resulting from combustion of fuel and driving wheels driven by the driving force of the engine, wherein the power transmission apparatus includes: a motor that is provided at the driving path, and drives the driving wheels through the driving path by generating driving force resulting from electrical energy, and transforms kinetic energy at the driving path to electrical energy; a normal close type clutch that is provided at the driving path and disposed between the engine and the motor, includes an input communicated with the engine and an output communicated with the driving wheels, and is selectively set in an engaging state in which the input is engaged with the output and a released state in which the input is released from the output, wherein the clutch is normally set in the engaging state by biasing force of a biasing member and is set in the released state when hydraulic pressure is applied; and a hydraulic-pressure feeding device configured to adjust the hydraulic pressure and supply the adjusted hydraulic pressure to the clutch, the control device comprising:

a control device configured to control the hydraulic-pressure feeding device so that the hydraulic pressure applied to the clutch has a desired level, wherein in a case of changing the clutch from the engaged state to the released state, if a difference between rotation number of the input and that of the output is smaller than a predetermined value, the control device controls the hydraulic-pressure feeding device so that the hydraulic pressure applied to the clutch has a first level to bring the clutch to a fully released state; and, wherein if the difference becomes equal to or larger than the predetermined value, the control device controls the hydraulic-pressure feeding device so that the hydraulic pressure applied to the clutch has a second level lower than the first level to bring and keep the clutch to a state just before the engaged state.

According to the first and fifth aspects, in the case of changing the normal close type clutch from the engaged state to the released state, if the difference between rotation number of the input and that of the output is smaller than a predetermined value (i.e., at a just beginning time of the regenerative control), the control device, controls the hydraulic-pressure feeding device so that the hydraulic pressure supplied to the clutch has the first level or pressure, and brings the clutch to the fully released state. In this way, since the hydraulic pressure the first level may be applied to the clutch from a very beginning time of disengagement of the clutch, if the first level is set to be comparatively high pressure, the disengagement process of the clutch has been finished as early as possible. In the meanwhile, regarding the regenerative control in parallel with the disengagement of the clutch, the kinetic energy resulting from inertia of the moving vehicle may be consumed due to engine friction (engine brake) for a time interval from beginning of the disengagement to completion of the disengagement. However, in that the disengagement process of the clutch has been finished as early as possible as mentioned above (in other words, the time taken for the disengagement process becomes short), the consumption of the kinetic energy due to the engine friction may reduce, and, further, the energy regeneration efficiency may be improved by enlarging a region in which the energy is able to be regenerated.

Moreover, the control device, as mentioned above, brings the clutch to the fully released state, and, thereafter, if the difference becomes equal to or larger than the predetermined value, controls the hydraulic-pressure feeding device so that the hydraulic pressure applied to the clutch has the second level lower than the first level, and brings and keeps the clutch to the state just before the engaged state. In this manner, in bringing the clutch to the engaged state, it is possible to quickly change the clutch from the state just before the engaged state to the engaged state. For example, it is possible to shorten the engagement process time in the invention as compared to an engagement process which changes the clutch to the engaged state from a state more approximate to the fully released state than to the state just before the engaged state. Therefore, the driver may feel well that the vehicle starts being accelerated when the driver puts his or her foot down during the regenerative control in order to re-accelerate the vehicle, in other words, the driver may have continuous good driving feeling.

According to the second aspect, the first level becomes a maximum output pressure of the hydraulic-pressure feeding device. Thus, the maximum output pressure of the hydraulic-pressure feeding device may be applied to the clutch from the very beginning time of disengagement of the clutch, and, therefore, the disengagement process of the clutch may have been finished at the highest processing rate. Additionally, the energy regeneration efficiency may be further improved by enlarging the region in which the energy is able to be regenerated.

According to the third aspect, the hydraulic-pressure feeding device at least includes the electronic valve adjusting hydraulic-pressure source and the hydraulic pressure applied from the hydraulic-pressure source, and adjusts the hydraulic pressure by controlling opening and closing of the electronic valve. In this way, it is possible with a simple configuration to appropriately adjust the hydraulic pressure applied to the clutch.

According to the fourth aspect, the hydraulic-pressure feeding device at least includes a pump, and adjusts the hydraulic pressure by controlling injection rate of the pump. In this way, it is possible with a simpler configuration to appropriately adjust the hydraulic pressure applied to the clutch.

What is claimed is:

1. A power transmission apparatus disposed at a driving path between an engine for generating driving force resulting from combustion of fuel and driving wheels driven by the driving force of the engine, the power transmission apparatus comprising:

a motor that is provided at the driving path, and drives the driving wheels through the driving path by generating driving force resulting from electrical energy, and transforms kinetic energy at the driving path to electrical energy;

a normal close type clutch that is provided at the driving path and disposed between the engine and the motor, includes an input communicated with the engine and an output communicated with the driving wheels, and is selectively set in an engaging state in which the input is engaged with the output and a released state in which the input is released from the output, wherein the clutch is normally set in the engaging state by biasing force of a biasing member and is set in the released state when hydraulic pressure is applied;

a hydraulic-pressure feeding device configured to adjust the hydraulic pressure and supply the adjusted hydraulic pressure to the clutch; and a control device configured to control the hydraulic-pressure feeding device so that the hydraulic pressure applied to the clutch has a desired level, wherein in a case of changing the clutch from the engaged state to the released state, if a difference between rotation number of the input and that of the output is smaller than a predetermined value, the control device controls the hydraulic-pressure feeding device so that the hydraulic pressure applied to the clutch has a first level to bring the clutch to a fully released state; and, wherein if the difference becomes equal to or larger than the predetermined value, the control device controls the hydraulic-pressure feeding device so that the hydraulic pressure applied to the clutch has a second level lower than the first level to bring and keep the clutch to a state just before the engaged state.

2. The power transmission apparatus according to claim 1, wherein the first level is a maximum output pressure of the hydraulic-pressure feeding device.

3. The power transmission apparatus according to claim 2, wherein
the hydraulic-pressure feeding device includes an hydraulic-pressure source and an electronic valve for adjusting the hydraulic-pressure applied from the hydraulic-pressure source, and
the control device adjusts the hydraulic pressure by controlling opening and closing of the electronic valve.

4. The power transmission apparatus according to claim 2, wherein
the hydraulic-pressure feeding device includes a pump, and
the control device adjusts the hydraulic pressure by controlling injection rate of the pump.

5. The power transmission apparatus according to claim 1, wherein
the hydraulic-pressure feeding device includes an hydraulic-pressure source and an electronic valve for adjusting the hydraulic-pressure applied from the hydraulic-pressure source, and
the control device adjusts the hydraulic pressure by controlling opening and closing of the electronic valve.

6. The power transmission apparatus according to claim 1, wherein
the hydraulic-pressure feeding device includes a pump, and
the control device adjusts the hydraulic pressure by controlling injection rate of the pump.

7. A power transmission control apparatus for a power transmission apparatus disposed at a driving path between an engine for generating driving force resulting from combustion of fuel and driving wheels driven by the driving force of the engine, wherein the power transmission apparatus includes: a motor that is provided at the driving path, and drives the driving wheels through the driving path by generating driving force resulting from electrical energy, and transforms kinetic energy at the driving path to electrical energy; a normal close type clutch that is provided at the driving path and disposed between the engine and the motor, includes an input communicated with the engine and an output communicated with the driving wheels, and is selectively set in an engaging state in which the input is engaged with the output and a released state in which the input is released from the output, wherein the clutch is normally set in the engaging state by biasing force of a biasing member and is set in the released state when hydraulic pressure is applied; and a hydraulic-pressure feeding device configured to adjust the hydraulic pressure and supply the adjusted hydraulic pressure to the clutch, the control device comprising:

a control device configured to control the hydraulic-pressure feeding device so that the hydraulic pressure applied to the clutch has a desired level, wherein in a case of changing the clutch from the engaged state to the released state, if a difference between rotation number of the input and that of the output is smaller than a predetermined value, the control device controls the hydraulic-pressure feeding device so that the hydraulic pressure applied to the clutch has a first level to bring the clutch to a fully released state; and, wherein if the difference becomes equal to or larger than the predetermined value, the control device controls the hydraulic-pressure feeding device so that the hydraulic pressure applied to the clutch has a second level lower than the first level to bring and keep the clutch to a state just before the engaged state.

8. The power transmission control apparatus according to claim 7, wherein the first level is a maximum output pressure of the hydraulic-pressure feeding device.

9. The power transmission control apparatus according to claim 8, wherein
the hydraulic-pressure feeding device includes an hydraulic-pressure source and an electronic valve for adjusting the hydraulic-pressure applied from the hydraulic-pressure source, and
the control device adjusts the hydraulic pressure by controlling opening and closing of the electronic valve.

10. The power transmission control apparatus according to claim 8, wherein
the hydraulic-pressure feeding device includes a pump, and
the control device adjusts the hydraulic pressure by controlling injection rate of the pump.

11. The power transmission control apparatus according to claim 7, wherein
the hydraulic-pressure feeding device includes an hydraulic-pressure source and an electronic valve for adjusting the hydraulic-pressure applied from the hydraulic-pressure source, and
the control device adjusts the hydraulic pressure by controlling opening and closing of the electronic valve.

12. The power transmission control apparatus according to claim 7, wherein
the hydraulic-pressure feeding device includes a pump, and
the control device adjusts the hydraulic pressure by controlling injection rate of the pump.

* * * * *